United States Patent
Kobayashi

(10) Patent No.: US 12,545,219 B2
(45) Date of Patent: Feb. 10, 2026

(54) POWER SUPPLY DEVICE, CONTROL METHOD, AND STORAGE MEDIUM

(71) Applicant: HONDA MOTOR CO., LTD., Tokyo (JP)

(72) Inventor: Kazuya Kobayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 18/400,888

(22) Filed: Dec. 29, 2023

(65) Prior Publication Data

US 2024/0227749 A1    Jul. 11, 2024

(30) Foreign Application Priority Data

Jan. 6, 2023 (JP) ................................ 2023-001136

(51) Int. Cl.
| | |
|---|---|
| *B60T 7/12* | (2006.01) |
| *B60R 16/023* | (2006.01) |
| *B60R 16/03* | (2006.01) |
| *H02J 9/06* | (2006.01) |

(52) U.S. Cl.
CPC ............ *B60T 7/12* (2013.01); *B60R 16/0232* (2013.01); *B60R 16/03* (2013.01); *H02J 9/068* (2020.01)

(58) Field of Classification Search
CPC ....... B60T 7/12; B60R 16/0232; B60R 16/03; H02J 9/068; H02H 1/0007; H02H 3/05; H02H 3/08
See application file for complete search history.

(56) References Cited

U.S. PATENT DOCUMENTS

| | | | |
|---|---|---|---|
| 6,211,681 B1 | 4/2001 | Kagawa et al. | |
| 2018/0126866 A1 | 5/2018 | Nozawa | |
| 2021/0009102 A1* | 1/2021 | Nakayama | ................ B60T 7/12 |

(Continued)

FOREIGN PATENT DOCUMENTS

| | | | | |
|---|---|---|---|---|
| CN | 115027269 A | * | 9/2022 | ............ B60L 3/0023 |
| JP | 2001-045602 A | | 2/2001 | |

(Continued)

OTHER PUBLICATIONS

May 21, 2024, Translation of Japanese Office Action issued for related JP Application No. 2023-001136.

*Primary Examiner* — Michael J Zanelli
(74) *Attorney, Agent, or Firm* — Paratus Law Group, PLLC

(57) ABSTRACT

A power supply device includes: a main power supply that supplies power to an electric device; an auxiliary power supply that supplies power to the electric device in response to a failure occurring in the main power supply; and a power supply control unit that performs a first failure determination related to the main power supply and a second failure determination related to the auxiliary power supply. The power supply control unit performs the first failure determination based on a result of first detection processing related to the main power supply, the power supply control unit performs the second failure determination based on a result of second detection processing related to the auxiliary power supply, and a time for which the first detection processing is performed is set to be shorter than a time for which the second detection processing is performed.

15 Claims, 9 Drawing Sheets

(56) References Cited

U.S. PATENT DOCUMENTS

| | | | |
|---|---|---|---|
| 2022/0063414 A1* | 3/2022 | Kim | ................... B60L 3/0084 |
| 2022/0063600 A1 | 3/2022 | Inoue | |
| 2022/0131363 A1 | 4/2022 | Yoshida | |

FOREIGN PATENT DOCUMENTS

| | | | | |
|---|---|---|---|---|
| JP | 2005-224047 A | | 8/2005 | |
| JP | 2007-145208 A | | 6/2007 | |
| JP | 2018-078682 A | | 5/2018 | |
| JP | 2018-078752 A | | 5/2018 | |
| JP | 2020089080 A | * | 6/2020 | |
| JP | 2020104529 A | * | 7/2020 | ............ B60W 10/20 |
| JP | 2022-041513 A | | 3/2022 | |
| JP | 2022-069929 A | | 5/2022 | |
| JP | 2022-072398 A | | 5/2022 | |

\* cited by examiner

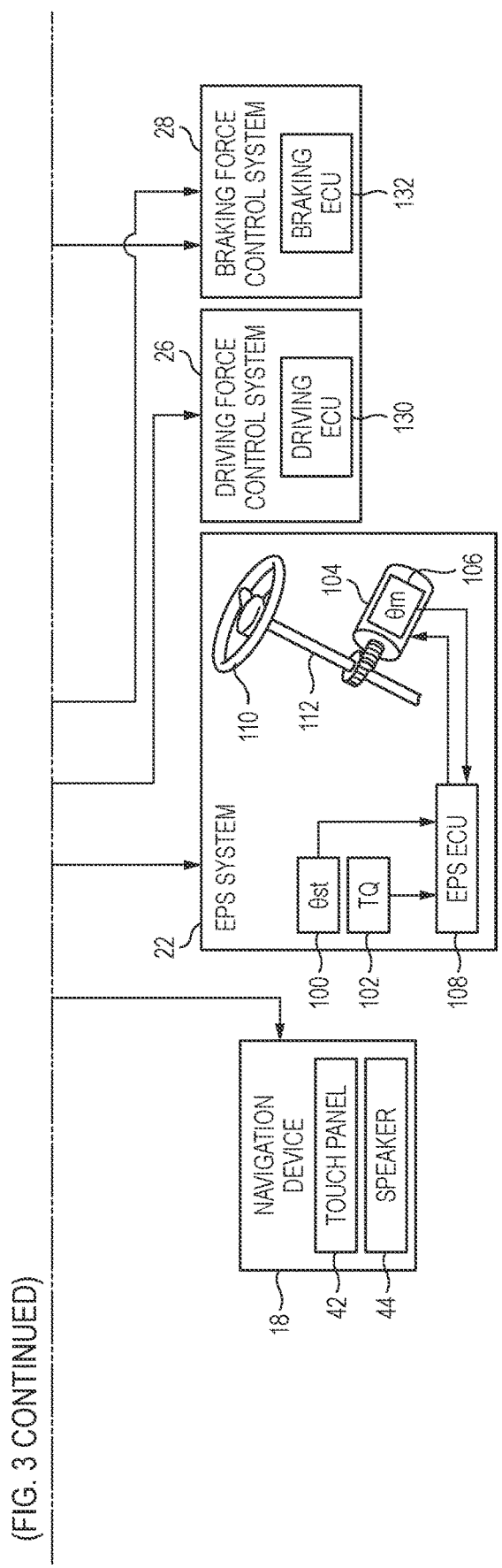

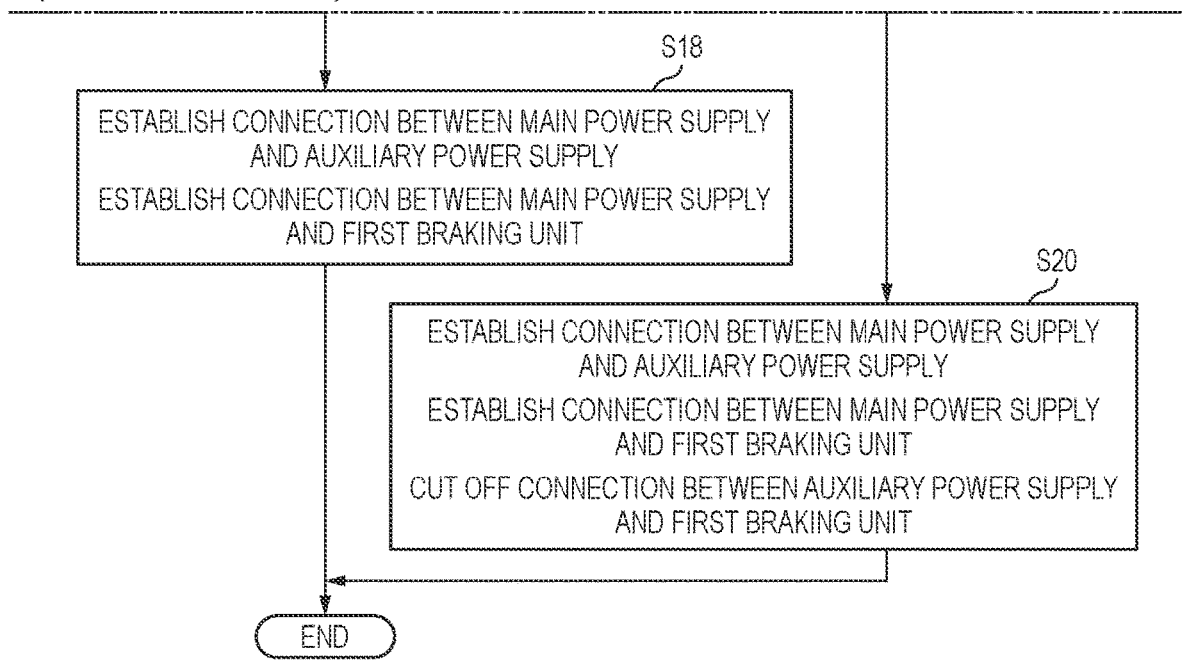

POWER SUPPLY DEVICE, CONTROL METHOD, AND STORAGE MEDIUM

This application is based upon and claims the benefit of priority from prior Japanese patent application No. 2023-001136, filed on Jan. 6, 2023, the entire contents of which are incorporated herein by reference.

TECHNICAL FIELD

The present disclosure relates to a power supply device, a control method, and a storage medium storing a control program.

BACKGROUND ART

In recent years, efforts have been actively made to provide access to a sustainable transportation system in consideration of vulnerable people among traffic participants. In order to implement the above, focus has been placed on research and development on further improving safety and convenience of traffic by research and development related to prevention safety technique.

In the related art, there is known a remote parking system that remotely operates a vehicle to park the vehicle in a designated predetermined parking space or to cause the vehicle to exit from a parking space. There is known a vehicle including a main power supply (secondary battery) that supplies power to vehicle electrical components during normal vehicle traveling or during vehicle parking control, and an auxiliary power supply (capacitor) that supplies power to a safety device that decelerates or stops the vehicle when a failure occurs in the main power supply. JP2018-078752A describes an electric automobile, including: a main power supply that stores power to be supplied to a motor for traveling, an auxiliary machine that operates with power having a voltage lower than an output voltage of the main power supply, an auxiliary machine power supply whose output voltage is equal to a drive voltage of the auxiliary machine, and a short circuit detection unit that detects a short circuit in the auxiliary machine power supply, in which the electric automobile can continue the power supply to the important auxiliary machine even when the auxiliary machine power supply is short-circuited.

SUMMARY

According to JP2018-078752A, when the auxiliary machine power supply is short-circuited, the short circuit is detected by the short circuit detection unit, the short-circuited path is cut off by a cutoff switch, and it is possible to supply power from the auxiliary machine power supply to the auxiliary machine via a separately provided detour path. In order to perform such operation, a cutoff circuit to cut off the short-circuited path and a detour circuit to supply power to the auxiliary machine are required, which complicates the configuration and increases the cost. Therefore, there is room for improvement in controlling operation of a device including a main power supply and an auxiliary power supply when a failure occurs in the power supply.

Aspects of embodiments of the present disclosure relate to providing a power supply device, a control method, and a storage medium storing a control program that enables detection of a failure related to a main power supply at an early stage while preventing false detection of a failure related to an auxiliary power supply.

According to an aspect of the present disclosure, there is provided a power supply device, including:
  a main power supply that supplies power to an electric device:
  an auxiliary power supply that supplies power to the electric device in response to a failure occurring in the main power supply: and
  a power supply control unit that performs a first failure determination related to the main power supply and a second failure determination related to the auxiliary power supply, in which
  the power supply control unit performs the first failure determination based on a result of first detection processing related to the main power supply,
  the power supply control unit performs the second failure determination based on a result of second detection processing related to the auxiliary power supply, and
  the power supply control unit sets a time for which the first detection processing is performed to be shorter than a time for which the second detection processing is performed.

According to another aspect of the present disclosure, there is provided a control method for a power supply device, the power supply device including a main power supply that supplies power to an electric device, an auxiliary power supply that supplies power to the power apparatus in response to a failure occurring in the main power supply, and a power supply control unit that performs a first failure determination related to the main power supply and a second failure determination related to the auxiliary power supply, the control method including:
  performing, by the power supply control unit, the first failure determination based on a result of first detection processing related to the main power supply,
  performing, by the power supply control unit, the second failure determination based on a result of second detection processing related to the auxiliary power supply, and
  setting, by the power supply control unit, a time for which the first detection processing is performed to be shorter than a time for which the second detection processing is performed.

According to another aspect of the present disclosure, there is provided a non-transitory computer readable medium storing a control program for a power supply device, the power supply device including a main power supply that supplies power to a power apparatus, an auxiliary power supply that supplies power to the power apparatus in response to a failure occurring in the main power supply, and a power supply control unit that performs a first failure determination related to the main power supply and a second failure determination related to the auxiliary power supply, the control program causing the power supply control unit to execute a process including:
  performing the first failure determination based on a result of first detection processing related to the main power supply,
  performing the second failure determination based on a result of second detection processing related to the auxiliary power supply is performed, and
  setting a time for which the first detection processing is performed to be shorter than a time for which the second detection processing is performed.

According to the present disclosure, it is provided a power supply device, a control method, and a storage medium storing a control program that enables detection of a failure related to a main power supply at an early stage while preventing false detection of a failure related to an auxiliary power supply. The present disclosure may contribute to development of a sustainable transportation system, accordingly.

BRIEF DESCRIPTION OF DRAWINGS

Exemplary embodiment(s) of the present invention will be described in detail based on the following figures, wherein.

DESCRIPTION OF EMBODIMENTS

Figure 1:
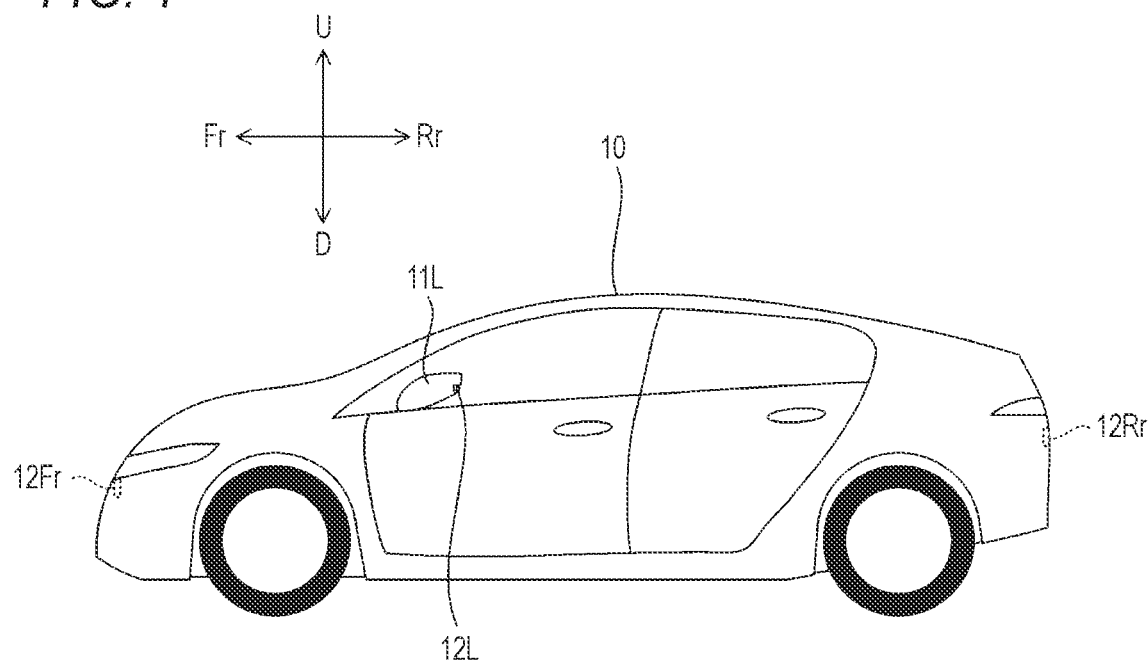
FIG. 1 is a side view showing an example of a vehicle equipped with a power supply device according to the present disclosure.

Hereinafter, an embodiment of a power supply device, a control method, and a control program according to the present disclosure will be described with reference to the attached drawings. Note that the drawings are viewed in directions of reference numerals. In the present description and the like, in order to simplify and clarify the description, a front-rear direction, a left-right direction, and an up-down direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

(Vehicle 10 Equipped with Power Supply Device)

Figure 2:
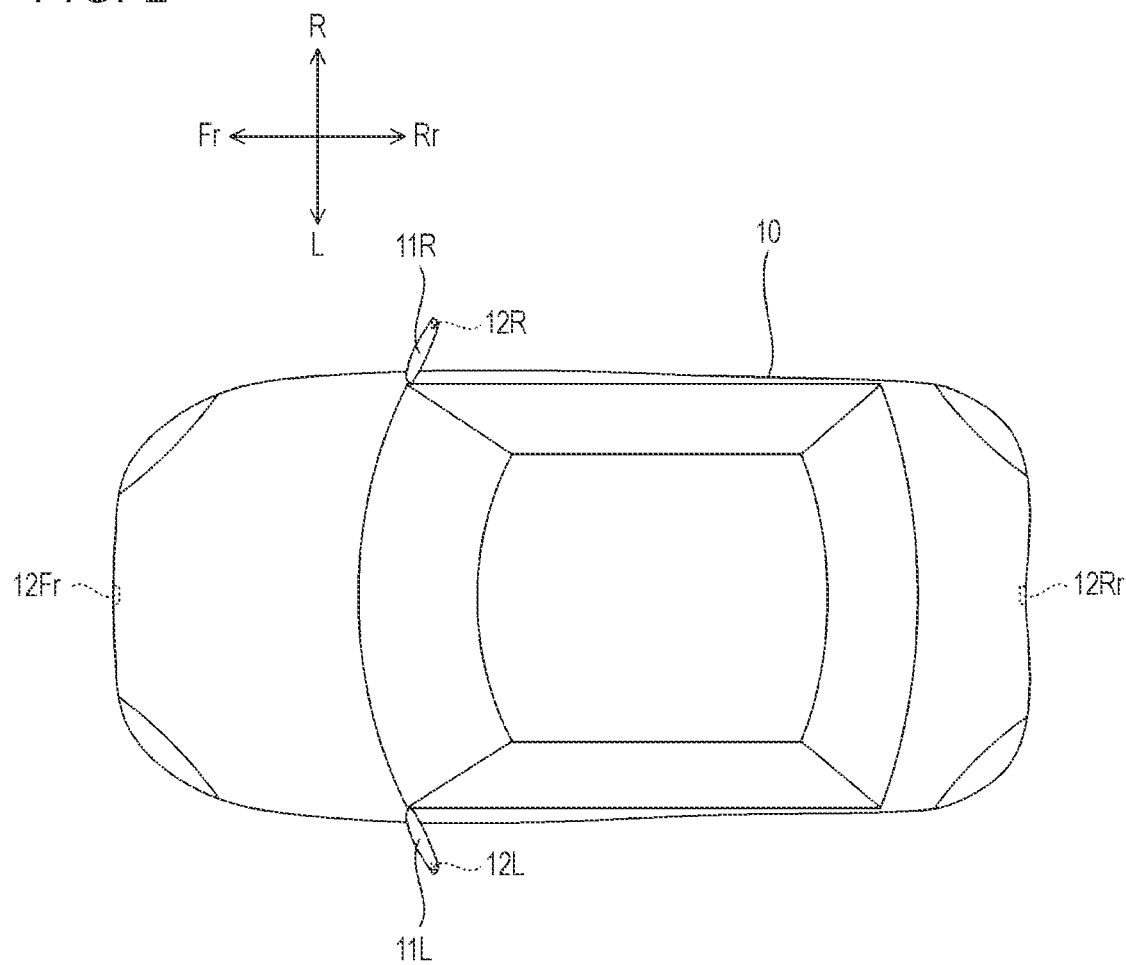
FIG. 2 is a top view of the vehicle shown in FIG. 1.

FIG. 1 is a side view showing an example of the vehicle 10 equipped with a power supply device according to the present invention. FIG. 2 is a top view of the vehicle 10 shown in FIG. 1. The vehicle 10 is an example of a moving body in the present disclosure.

The vehicle 10 is an automobile including a drive source (not shown) and wheels, which include drive wheels driven by power of the drive source and wheels that are steerable. In the present embodiment, the vehicle 10 is a four-wheeled automobile including a pair of left and right front wheels and a pair of left and right rear wheels. The drive source of the vehicle 10 is, for example, an electric motor. Note that the drive source of the vehicle 10 may be an internal combustion engine such as a gasoline engine or a diesel engine, or may be a combination of an electric motor and an internal combustion engine. The drive source of the vehicle 10 may drive the pair of left and right front wheels, the pair of left and right rear wheels, or the four wheels including the pair of left and right front wheels and the pair of left and right rear wheels. Both the front wheels and the rear wheels may be the steerable steering wheels, or either one of the front wheels and the rear wheels may be the wheels that are steerable.

The vehicle 10 further includes side mirrors 11L and 11R. The side mirrors 11L and 11R are mirrors (back mirrors) that are provided on outer sides of front seat doors of the vehicle 10 and for a driver to check a rear side and rear lateral sides. Each of the side mirrors 11L and 11R is fixed to a main body of the vehicle 10 by a rotation shaft that extends in a perpendicular direction, and may be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and that images the front side of the vehicle 10. The rear camera 12Rr is a digital camera that is provided at a rear portion of the vehicle 10 and that images the rear side of the vehicle 10. The left side camera 12L is a digital camera that is provided at the left side mirror 11L of the vehicle 10 and that images the left side of the vehicle 10. The right side camera 12R is a digital camera that is provided at the right side mirror 1lR of the vehicle 10 and that images the right side of the vehicle 10.

(Internal Configuration of Vehicle 10)

Figure 3:
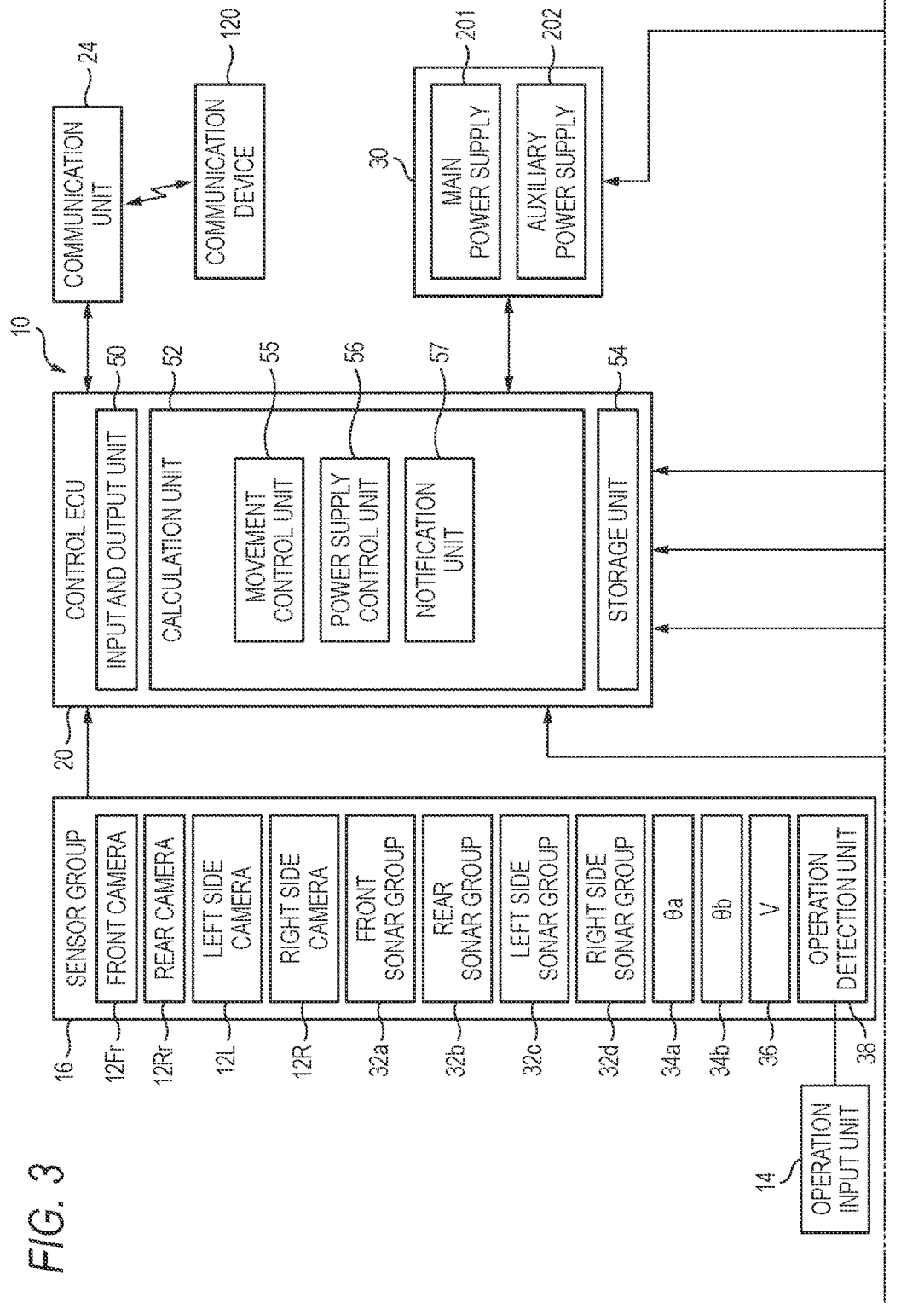
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 includes a driving force control system 26, a braking force control system 28, and a power supply 30.

The sensor group 16 acquires various detection values used for control performed by the control ECU 20. The sensor group 16 includes the front camera 12Fr, the rear camera 12Rr, the left side camera 12L, and the right side camera 12R. The sensor group 16 includes a front sonar group 32a, a rear sonar group 32b, a left side sonar group 32c, and a right side sonar group 32d. The sensor group 16 includes wheel sensors 34a and 34b, a vehicle speed sensor 36, and an operation detection unit 38. Note that the sensor group 16 may include a radar.

The front camera 12Fr, the rear camera 12Rr, the left side camera 12L, and the right side camera 12R acquire recognition data (for example, surrounding image data) for recognizing an external environment of the vehicle 10 by imaging the surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image formed by the left side image and the right side image may be referred to as a side image.

The front sonar group 32a, the rear sonar group 32b, the left side sonar group 32c, and the right side sonar group 32d emit sound waves to the surroundings of the vehicle 10, and receive reflected sounds from other objects. The front sonar group 32a includes, for example, four sonars. The sonars that constitute the front sonar group 32a are provided on an obliquely left front side, a front left side, a front right side, and an obliquely right front side of the vehicle 10, respectively. The rear sonar group 32b includes, for example, four sonars. The sonars that constitute the rear sonar group 32b are provided on an obliquely left rear side, a rear left side, a rear right side, and an obliquely right rear side of the vehicle 10, respectively. The left side sonar group 32c includes, for example, two sonars. The sonars that constitute the left side sonar group 32c are provided at a left side front portion and a left side rear portion of the vehicle 10, respectively. The right side sonar group 32d includes, for example, two sonars. The sonars that constitute the right side sonar group 32d are provided at a right side front portion and a right side rear portion of the vehicle 10, respectively.

The wheel sensors 34a and 34b detect rotation angles of the wheels of the vehicle 10. The wheel sensors 34a and 34b may be implemented by angle sensors, or may be implemented by displacement sensors. The wheel sensors 34a and 34b output detection pulses every time the wheels are rotated by a predetermined angle. The detection pulses output from the wheel sensors 34a and 34b are used for calculating rotation angles of the wheels and rotation speeds of the wheels. A movement distance of the vehicle 10 is calculated based on the rotation angles of the wheels. The wheel sensor 34a detects, for example, a rotation angle θa of the left rear wheel. The wheel sensor 34b detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content of a user performed using an operation input unit 14, and outputs the detected operation content to the control ECU 20. The operation input unit 14 includes various user interfaces such as a side mirror switch for switching between open and closed states of the side mirrors 11L and 1IR, and a shift lever (selector lever or selector).

The navigation device 18 detects a current position of the vehicle 10 by using, for example, a global positioning system (GPS), and guides the user to a path to a destination. The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various types of guide information to the user of the vehicle 10 by voice.

The touch panel 42 is configured such that various commands are input, using the touch panel, to the control ECU 20. For example, the user may input a command related to movement assistance of the vehicle 10 via the touch panel 42. The movement assistance includes parking assistance and parking-lot-leaving assistance of the vehicle 10. The touch panel 42 is configured to display various screens related to control contents of the control ECU 20. For example, a screen related to the movement assistance of the vehicle 10 is displayed on the touch panel 42. Specifically, a parking assistance button for requesting the parking assistance and a parking-lot-leaving assistance button for requesting the parking-lot-leaving assistance of the vehicle 10 are displayed on the touch panel 42. The parking assistance button includes an automatic parking button for requesting parking by automatic steering of the control ECU 20, and a parking assistance button for requesting assistance during parking by an operation of the user. The parking-lot-leaving assistance button includes an automatic parking-lot-leaving button for requesting parking-lot-leaving by the automatic steering of the control ECU 20, and a parking-lot-leaving assistance button for requesting assistance during parking-lot-leaving by an operation of the user. Constituent elements other than the touch panel 42, for example, a smartphone or a tablet terminal may be used as the input device or the display device.

The power supply 30 includes a main power supply 201 and an auxiliary power supply 202. The main power supply 201 is a power supply that supplies power to a power apparatus mounted on the vehicle 10. For example, the main power supply 201 supplies power to an anti-lock brake system (ABS) that operates during sudden brake, and to an electric power steering (EPS) that operates during abrupt steering. The main power supply 201 supplies power to an auto parking system (APS) for performing automatic parking of the vehicle 10. The main power supply 201 also supplies power to a vehicle stability assist (VSA) and an electric parking brake (EPB) that decelerate or stop the vehicle 10. The main power supply 201 is a power supply that supplies power to (charges) the auxiliary power supply 202 via a pass-through circuit.

The auxiliary power supply 202 is a power supply that supplies power to the VSA and EPB when a failure occurs in the main power supply 201. The auxiliary power supply 202 is used to cause fail-safe to operate by operation of VSA and EPB. The main power supply 201 is, for example, a secondary battery such as a lithium ion battery, a nickel hydrogen battery, or a lead acid battery. The auxiliary power supply 202 is, for example, an electric double layer capacitor. The main power supply 201 and the auxiliary power supply 202 have a voltage of 12 V, for example. The power supply 30 is connected to the control ECU 20.

The control ECU 20 includes an input and output unit 50, a calculation unit 52, and a storage unit 54. The calculation unit 52 is implemented by, for example, a central processing unit (CPU). The calculation unit 52 performs various kinds of control by controlling the units based on a program stored in the storage unit 54. The calculation unit 52 receives and outputs a signal from and to each unit connected to the control ECU 20 via the input and output unit 50. The control ECU 20 is an example of the power apparatus in the present disclosure.

The calculation unit 52 includes a movement control unit 55 that performs movement control of the vehicle 10, a power supply control unit 56 that determines failures related to the main power supply 201 and the auxiliary power supply 202, and a notification unit 57 that notifies the user of information related to movement control.

The movement control unit 55 performs automatic parking assistance and automatic parking-lot-leaving assistance of the vehicle 10 through automatic steering in which the steering 110 is automatically operated under control of the movement control unit 55. In the automatic parking assistance and the automatic parking-lot-leaving assistance, an accelerator pedal (not shown), a brake pedal (not shown), and the operation input unit 14 are automatically operated. The movement control unit 55 also performs parking assistance guidance and parking-lot-leaving assistance guidance when the user (driver) manually parks the vehicle 10 and manually leaves a parking lot by operating the accelerator pedal, brake pedal, and operation input unit 14. Note that during the automatic parking assistance and the automatic parking-lot-leaving assistance, the user may be in the vehicle 10, or may be in a state where the user has gotten off the vehicle 10 and is outside.

For example, the movement control unit 55 performs the movement control for executing movement of the vehicle 10 based on the recognition data of the external environment 30) of the vehicle 10 acquired by the front camera 12Fr, the rear camera 12Rr, the left side camera 12L, and the right side camera 12R, and a parking space designated by the user. The movement control includes parking control for automatically parking the vehicle 10 in a predetermined parking space (target parking position) and parking-lot-leaving control for causing the vehicle 10 to automatically leave the predetermined parking space to a target movement position. The movement control unit 55 executes the parking control and the parking-lot-leaving control according to instruction signals input from the outside via the input and output unit 50. The input from the outside includes input via wireless communication from an information terminal or the like that is portable by the user of the vehicle 10. The movement control unit 55 transmits information related to the parking control and the parking-lot-leaving control to an external information terminal via the input and output unit 50.

When a failure related to the main power supply 201 of the vehicle 10 is detected, the movement control unit 55 controls a braking unit of the vehicle 10 to stop the vehicle 10. The braking unit of the vehicle 10 includes, for example, a braking force control system 28, which will be described later.

The power supply control unit 56 performs first detection processing related to the main power supply 201, and performs a first failure determination related to the main power supply 201 based on a result of the first detection processing. The power supply control unit 56 performs second detection processing related to the auxiliary power supply 202, and performs a second failure determination related to the auxiliary power supply 202 based on a result of the second detection processing. The power supply control unit 56 sets a time for the first detection processing related to the main power supply 201 to be shorter than a time for the second detection processing related to the auxiliary power supply 202.

The power supply control unit 56 detects, for example, a voltage drop in the main power supply 201 as the first failure determination related to the main power supply 201. The power supply control unit 56 detects, for example, a short circuit between the auxiliary power supply 202 and the braking unit connected to a downstream side of the auxiliary power supply 202, as the second failure determination related to the auxiliary power supply 202. A first failure related to the main power supply 201 includes, for example, a voltage drop of the main power supply 201 due to cutoff of power supply from a direct current/direct current (DC/DC) converter (see FIG. 4) that supplies power to a steady load. The first failure related to the main power supply 201 also includes a voltage drop of the main power supply 201 due to a decrease in performance caused by deterioration of the main power supply 201 itself. The first failure related to the main power supply 201 also includes a voltage drop in the main power supply 201 due to a combination of cutoff of power supply from the DC/DC converter and deterioration of the main power supply 201 itself.

The power supply control unit 56 detects a failure related to the main power supply 201 through the first failure determination related to the main power supply 201, and after a power supply source of the electric device is switched from the main power supply 201 to the auxiliary power supply 202, starts the second detection processing related to the auxiliary power supply 202.

When no failure related to the main power supply 201 is detected through the first failure determination related to the main power supply 201, the power supply control unit 56 causes the main power supply 201 to supply power to (charge) the auxiliary power supply 202. On the other hand, when a failure related to the main power supply 201 is detected through the first failure determination related to the main power supply 201, the power supply control unit 56 cuts off power supply from the main power supply 201 to the auxiliary power supply 202.

After cutting off the power supply from the main power supply 201 to the auxiliary power supply 202 upon detection of a failure related to the main power supply 201, when no failure related to the auxiliary power supply 202 is detected by the second failure determination related to the auxiliary power supply 202, the power supply control unit 56 causes the auxiliary power supply 202 to supply power to the braking unit (for example, the braking force control system 28, which will be described later), and cuts off power supply from the auxiliary power supply 202 to the braking unit when a failure related to the auxiliary power supply 202 is detected by the second failure determination. After cutting off power supply from the auxiliary power supply 202 to the braking unit upon detection of a failure related to the auxiliary power supply 202, the power supply control unit 56 causes the main power supply 201 to supply power to the braking unit.

The notification unit 57 notifies the user of the vehicle 10 when a failure related to the main power supply 201 is detected and the braking unit is controlled to stop the vehicle 10. The notification includes, for example, a notification that "the vehicle 10 will be stopped due to a failure occurring in the power supply", a notification related to a response of a user, and the like.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby providing support for an occupant's operation on the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 may perform wireless communication with another communication device 120. Another communication device 120 includes a base station, a communication device of another vehicle, an information terminal such as a smartphone or a tablet terminal that is portable for the user of the vehicle 10. For example, the communication unit 24 includes an ultra wide band (UWB, registered trademark) interface for performing UWB communication with an information terminal. The information terminal will be described later.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown). The braking force control system 28 is an example of a braking unit in the present disclosure. The braking unit is an example of the electric device in the present disclosure.

(Configuration of Power Supply Device and Operation Thereof)

Next, configuration and operation of a power supply device 200 in the present disclosure will be described.

(Configuration of Power Supply Device 200)

Figure 4:
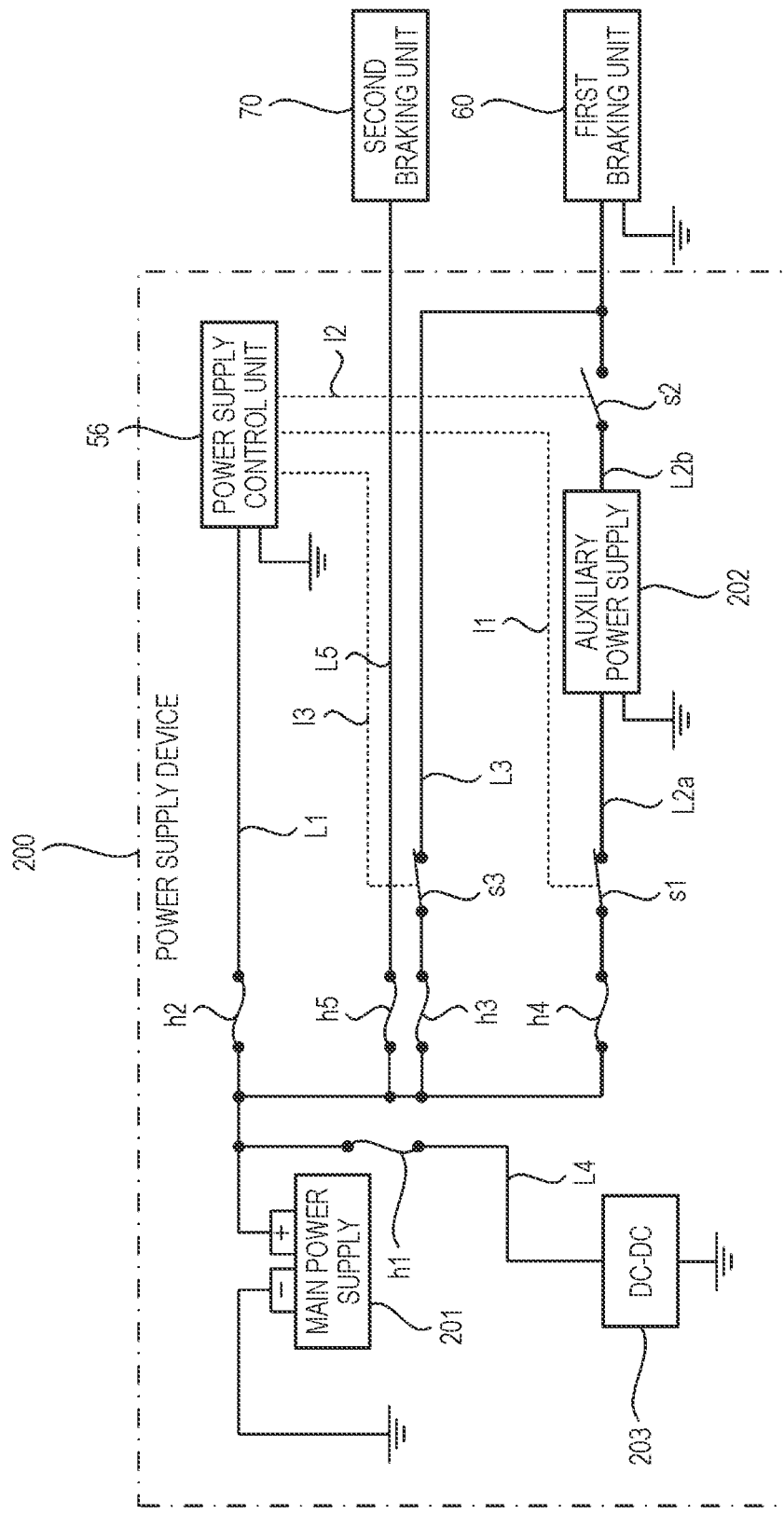
FIG. 4 is a diagram showing an example of a circuit configuration of the power supply device.

FIG. 4 is a diagram showing an example of a circuit configuration of the power supply device 200. As shown in FIG. 4, the power supply device 200 includes the main power supply 201, the auxiliary power supply 202, the power supply control unit 56, a first braking unit 60, a second braking unit 70, and a DC/DC converter 203. The power supply device 200 is a power supply device mounted on the vehicle 10 as described above. The power supply control unit 56 of the power supply device 200 is a power supply control unit included in the control ECU 20. The first braking unit 60 is an example of a braking unit in the present disclosure.

In the power supply device 200, the main power supply 201 is connected to the power supply control unit 56 via a power supply line L1. The power supply line L1 is provided with a fuse h2. The main power supply 201 may supply power to the power supply control unit 56.

The main power supply 201 is connected to the auxiliary power supply 202 via a power supply line L2a. The power supply line L2a is provided with a fuse h4 and a switch s1 connected in series. The main power supply 201 may supply power to (charge) the auxiliary power supply 202.

The main power supply 201 is connected to the first braking unit 60 via a power supply line L3. The power supply line L3 is provided with a fuse h3 and a switch s3 connected in series. The main power supply 201 may supply power to the first braking unit 60.

The main power supply 201 is connected to the second braking unit 70 via a power supply line L5. The power supply line L5 is connected to a fuse h5. The main power supply 201 may supply power to the second braking unit 70.

The auxiliary power supply 202 is connected to the first braking unit 60 via a power supply line L2b. The power supply line L2b is provided with a switch s2. The auxiliary power supply 202 may supply power to the first braking unit 60.

The DC/DC converter 203 is connected to the power supply control unit 56 via a power supply line L4. The power supply line L4 is provided with a fuse h1. The DC/DC converter 203 may supply power to the power supply control unit 56. The DC/DC converter 203 may supply power to an electric device such as headlights and other control units (not shown).

The power supply control unit 56 is connected to the switch s1 of the power supply line L2a by a signal line 11. The power supply control unit 56 is connected to the switch s2 of the power supply line L2b by a signal line 12. The power supply control unit 56 is connected to the switch s3 of the power supply line L3 by a signal line 13. The power supply control unit 56 has a function as a switching control unit that switches on/off of the switch s1, the switch s2, and the switch s3. The switch s1, the switch s2, and the switch s3 are implemented by, for example, field effect transistor (FET) switches.

The power supply control unit 56 has functions as an electric device such as integrated control module (ICM), APS, parking sensor system (PKS), ABS, and EPS.

The first braking unit 60 is included in the braking force control system 28 in FIG. 3, for example. The first braking unit 60 includes a VSA, an EPB, and the like. The second braking unit 70 is included in the braking force control system 28 in FIG. 3. The second braking unit 70 includes, for example, an electric servo brake (ESB).

(Operation of Power Supply Device 200 during Normal Time)

Based on FIG. 4, the operation of the power supply device 200 during a normal time will be described. First, the power supply control unit 56 of the control ECU 20 performs the first detection processing related to the main power supply 201. In the first detection processing, a voltage value of an output terminal (for example, +12 V) of the main power supply 201 is measured using, for example, a voltage sensor. The first detection processing detects whether there is a voltage drop at the output terminal, for example, whether the voltage value of the output terminal drops below 9.5 V. The power supply control unit 56 performs the first failure determination as to whether the time for which the voltage value drops below 9.5 V is, for example, 200 μsec or more. The power supply control unit 56 determines that a failure occurs in the main power supply 201 when it is detected in the first failure determination that the voltage value drops below 9.5 V for 200 μsec or more, and determines that no failure occurs in the main power supply 201 when it is detected that the voltage value drops below 9.5 V for no longer than 200 μsec.

When no failure related to the main power supply 201 is detected in the first failure determination, the power supply control unit 56 determines that the power supply device 200 is in a normal state and controls the power supply device 200 to operate normally. As shown in FIG. 4, the power supply control unit 56 controls the switch s1 of the power supply line L2a to be in an on state, the switch s2 of the power supply line L2b to be in an off state, and the switch s3 of the power supply line L3 to be in an on state. As a result, in the power supply device 200, power is supplied from the main power supply 201 to the power supply control unit 56 and the first braking unit 60. The main power supply 201 is caused to supply power to (charge) the auxiliary power supply 202.

(Operation of Power Supply Device 200 during Failure of Main Power Supply 201)

Figure 5:
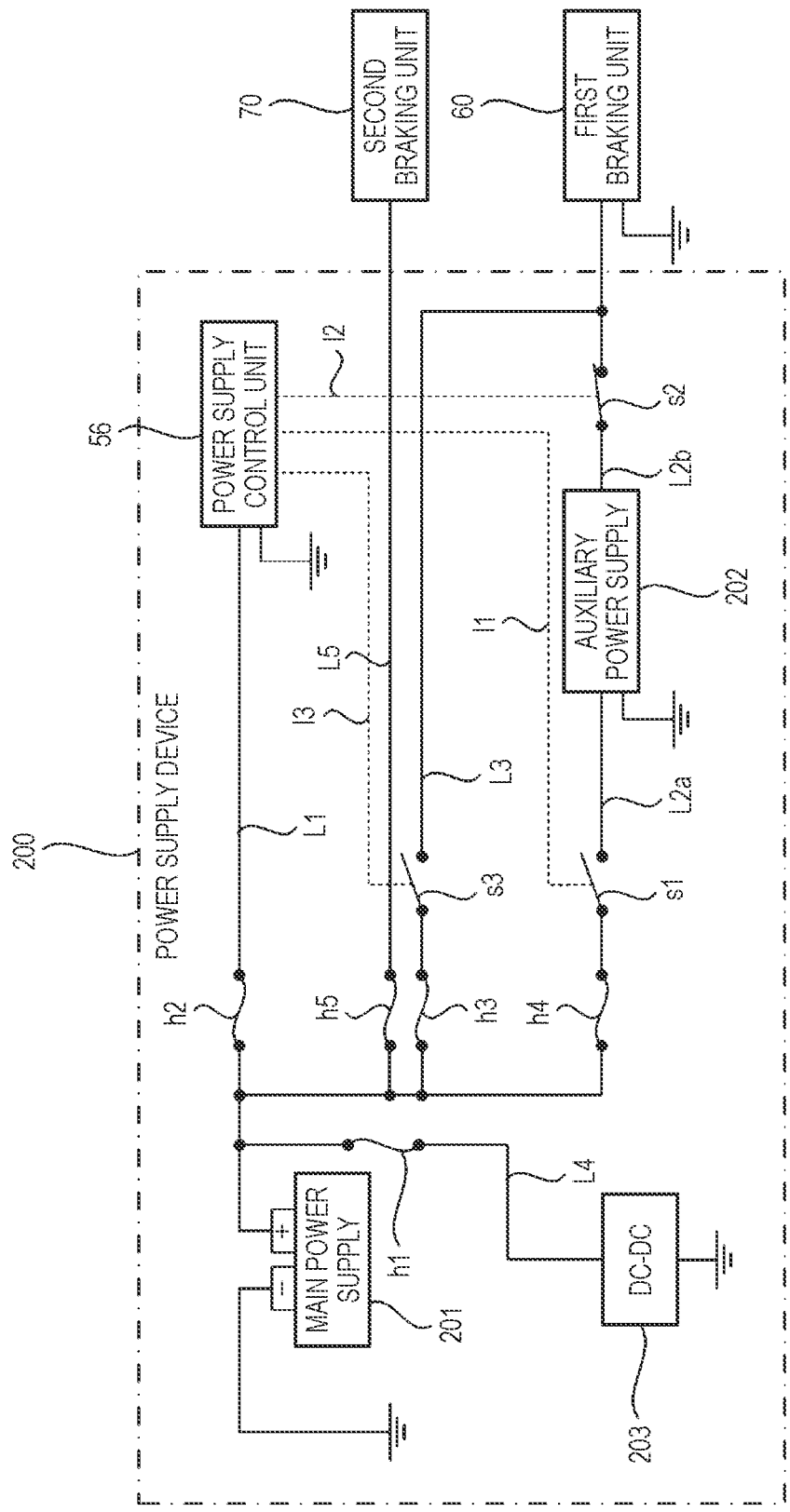
FIG. 5 is a diagram illustrating an operation of the power supply device when a failure related to a main power supply is detected.

FIG. 5 is a diagram illustrating an operation of the power supply device 200 when a failure related to the main power supply 201 is detected.

The power supply control unit 56 of the control ECU 20 performs the first detection processing related to the main power supply 201 as described above. The power supply control unit 56 determines that a failure (voltage drop) occurs in the main power supply 201 when it is detected in the first failure determination that the voltage value of the main power supply 201 drops below 9.5 V for 200 μsec or more, and determines that no failure (voltage drop) occurs in the main power supply 201 when it is detected that the voltage value of the main power supply 201 drops below 9.5 V for no longer than 200 μsec.

When a failure (voltage drop) related to the main power supply 201 is detected in the first failure determination, the power supply control unit 56 determines that the power supply device 200 is in a failure state and causes the power supply device 200 to perform operation during failure of main power supply: A voltage drop in the main power supply 201 occurs, for example, when a load on the DC/DC converter 203 increases. When the load on the DC/DC converter 203 increases, overcurrent protection operates (fuse h1 blows) and power supply from the DC/DC converter 203 is cut off. In this case, since the power that has been supplied from the DC/DC converter 203 is required to be supplied from the main power supply 201 as a load corresponding to the power is added to the load on the main power supply 201, a voltage drop occurs in the main power supply 201.

As shown in FIG. 5, during failure of main power supply, the power supply control unit 56 controls the switch s1 of the power supply line L2a to be in an off state, the switch s2 of the power supply line L2b to be in an on state, and the switch s3 of the power supply line L3 to be in an off state.

In the power supply device 200, when the switch s1 is turned off, the power supply (charging) from the main power supply 201 to the auxiliary power supply 202 is cut off. By cutting off the power supply (charging) from the main power supply 201 to the auxiliary power supply 202, the load on the main power supply 201 is reduced, so that a voltage drop in the main power supply 201 is prevented. In this way, a state in which power may be supplied from the main power supply 201 to the power supply control unit 56 is maintained.

Since the switch s2 is in an on state, power is supplied from the auxiliary power supply 202 to the first braking unit 60. Note that in the present example, the power supply line L2b connecting from the auxiliary power supply 202 to the first braking unit 60 is a single line, but the number of the power supply lines L2b is not limited to one. For example, in a case where the first braking unit 60 is configured to be connected to power supply lines of two systems, the number of the power supply lines L2b connecting from the auxiliary power supply 202 to the first braking unit 60 is two.

By turning off the switch s3, the power supply from the main power supply 201 to the first braking unit 60 is cut off.
(Operation of Power Supply Device 200 during Failure of Main Power Supply 201 and Auxiliary Power Supply 202)

Figure 6:
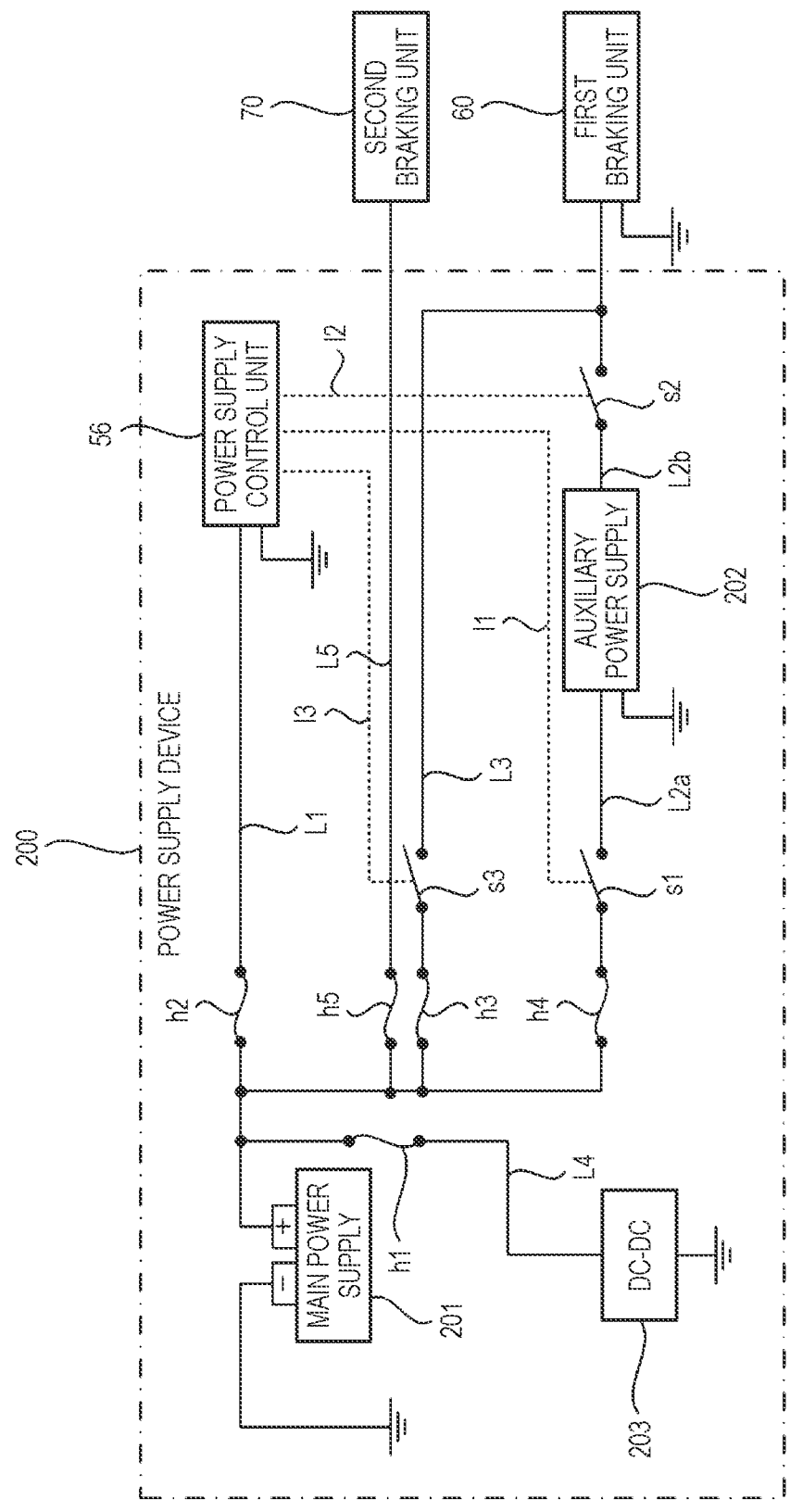
FIG. 6 is a diagram illustrating an operation of the power supply device when a failure related to the main power supply and an auxiliary power supply is detected.

FIG. 6 is a diagram illustrating an operation of the power supply device 200 when a failure related to the main power supply 201 and the auxiliary power supply 202 is detected.

The power supply control unit 56 of the control ECU 20 detects a failure related to the main power supply 201 by the first failure determination as described with reference to FIG. 5, and after switching the power supply source of the first braking unit 60 from the main power supply 201 to the auxiliary power supply 202 while cutting off the power supply from the main power supply 201 to the auxiliary power supply 202, and starts the second detection processing related to the auxiliary power supply 202. In the second detection processing, a voltage value of an output terminal of the auxiliary power supply 202 (for example, 12 V) is measured using, for example, a voltage sensor. The second detection processing detects whether there is a voltage drop at the output terminal, for example, whether the voltage value of the output terminal drops to 11 V or lower. For example, when a short circuit (ground fault) occurs between the auxiliary power supply 202 and the first braking unit 60, a voltage drop occurs due to a change in a resistance value. The power supply control unit 56 performs the second failure determination as to whether the time for which the voltage value drops to 11 V or lower is, for example, 30 msec or more. The power supply control unit 56 determines that a failure occurs in the auxiliary power supply 202 when it is detected in the second failure determination that the voltage value drops to 11 V or lower for 30 msec or more, and determines that no failure occurs in the auxiliary power supply 202 when it is detected that the voltage value drops to 11 V or lower for no longer than 30 msec.

When a failure (voltage drop) related to the auxiliary power supply 202 is detected in the second failure determination, the power supply control unit 56 determines that the power supply device 200 is in a failure state and causes the power supply device 200 to perform operation during failure of auxiliary power supply. As shown in FIG. 6, the power supply control unit 56 controls the switch s2 of the power supply line L2b to be in an off state.

In the power supply device 200, since the switch s2 is turned off, the power supply from the auxiliary power supply 202 to the first braking unit 60 is cut off.

Note that when no failure related to the auxiliary power supply 202 is detected in the second failure determination, the power supply control unit 56 maintains a state in which power is supplied from the auxiliary power supply 202 to the first braking unit 60 (the state shown in FIG. 5).
(First Failure Determination and Second Failure Determination)

Figure 7:
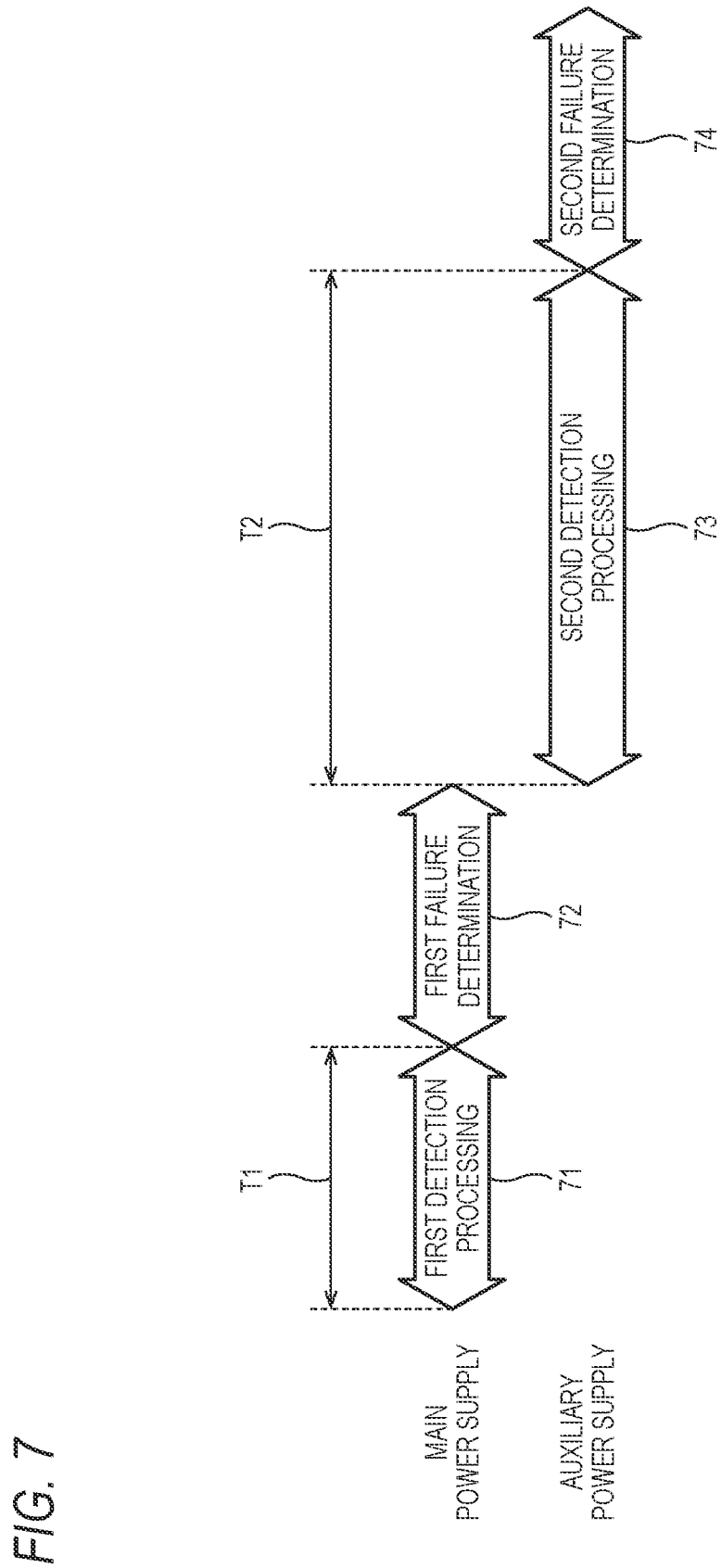
FIG. 7 is a diagram showing an example of execution timings of a first failure determination related to the main power supply and a second failure determination related to the auxiliary power supply.

Next, execution timings of the first failure determination related to the main power supply 201 and the second failure determination related to the auxiliary power supply 202 will be described. FIG. 7 is a diagram showing an example of the execution timings of the first failure determination related to the main power supply 201 and the second failure determination related to the auxiliary power supply 202. As shown in FIG. 7, the power supply control unit 56 first executes the first detection processing 71 related to the main power supply 201. A processing time T1 of the first detection processing 71 is, for example, 200 μsec. When the first detection processing 71 ends, the power supply control unit 56 executes the first failure determination 72 related to the main power supply 201 based on a result thereof.

After the first failure determination 72 related to the main power supply 201 ends, the power supply control unit 56 next starts executing the second detection processing 73 related to the auxiliary power supply 202. A processing time T2 of the second detection processing 73 is, for example, 30 msec. When the second detection processing 73 ends, the power supply control unit 56 executes the second failure determination 74 related to the auxiliary power supply 202 based on a result thereof.

For example, it is possible to shorten the processing time by setting the processing time T2 for detecting a failure of the auxiliary power supply 202 the same as the processing time T1 (200 μsec) for detecting a voltage drop in the main power supply 201. However, if the processing time T2 is shortened, a detection voltage at a position where a failure of the auxiliary power supply 202 is detected is unstable due to a resistance value of the switch s2 (FET) or the like provided in the power supply line L2b, and therefore accurate measurement may not be possible. On the other hand, for example, if the processing time T1 for detecting a voltage drop in the main power supply 201 is set to the same time as the processing time T2 (30 msec) for detecting a failure in the auxiliary power supply 202, false detection of the failure in the auxiliary power supply 202 may be prevented. However, the voltage drop of the main power supply 201 may become large, and it may be impossible to supply power from the main power supply 201 to the power supply control unit 56. Therefore, the processing time T1 is set to approximately 200 μsec as a time during which the voltage drop of the main power supply 201 may be prevented, and the processing time T2 is set to approximately 30 msec as a time during which the voltage of the auxiliary power supply 202 may be measured in a stable state.

Note that the present example shows a case where the second detection processing 73 and the second failure determination 74 related to the auxiliary power supply 202 are executed only once. If no failure related to the auxiliary power supply 202 is detected, the power supply control unit 56 repeats execution of the second detection processing 73 and the second failure determination 74 related to the auxiliary power supply 202 until a failure is detected. Furthermore, although the present example shows a case where the first detection processing 71 and the first failure determination 72 related to the main power supply 201 are executed only once, the power supply control unit 56 may repeatedly execute the first detection processing 71 and the first failure determination 72 in parallel with the execution of the second detection processing 73 and the second failure determination 74 related to the auxiliary power supply 202.

(Control Example of Power Supply Control Unit 56)

Figure 8:
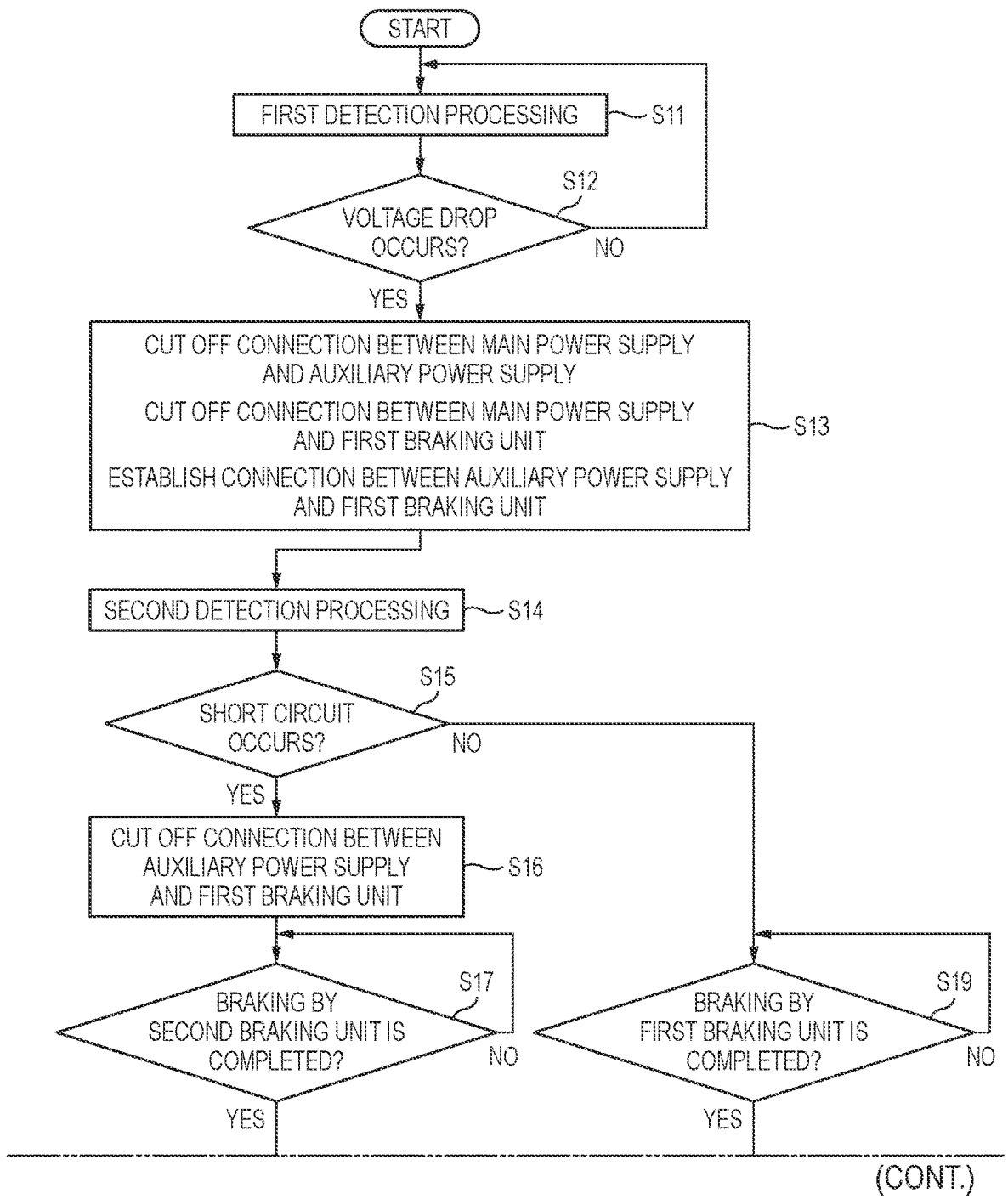
FIG. 8 is a flowchart showing an example of control of the power supply device by a power supply control unit.

Next, a control example of the power supply control unit 56 in the power supply device 200 will be described. FIG. 8 is a flowchart showing an example of control by the power supply control unit 56.

First, the power supply control unit 56 executes the first detection processing related to the main power supply 201 of the power supply device 200 (step S11). The first detection processing detects, for example, as described above, whether the voltage value of the main power supply 201 drops below 9.5 V.

Next, in the first detection processing in step S11, the power supply control unit 56 determines whether a voltage drop occurs in the main power supply 201 (first failure determination: step S12). The first failure determination is made based on, for example, as described above, whether the voltage value of the main power supply 201 (12 V) drops below 9.5 V for 200 μsec or longer.

In step S11, in a case where no voltage drop occurs in the main power supply 201 (step S11: No), the power supply control unit 56 returns to step S11 and repeats each processing.

In step S11, when a voltage drop occurs in the main power supply 201 (step S11: Yes), as shown in FIG. 5 for example, the power supply control unit 56 cuts off the connection between the main power supply 201 and the auxiliary power supply 202 by turning off the switch s1, cuts off the connection between the main power supply 201 and the first braking unit 60 by turning off the switch s3, and establish a connection between the auxiliary power supply 202 and the first braking unit 60 by turning on the switch s2 (step S13). In this way, power is supplied from the auxiliary power supply 202 to the first braking unit 60.

Next, the power supply control unit 56 executes the second detection processing related to the auxiliary power supply 202 of the power supply device 200 (step S14). In the second detection processing, for example, as described above, it is detected whether the voltage value of the auxiliary power supply 202 drops to 11 V or lower.

Next, in the second detection processing in step S14, the power supply control unit 56 determines whether a short circuit (ground fault) occurs between the auxiliary power supply 202 and the first braking unit 60 (second failure determination: step S14). The second failure determination is made based on, for example, as described above, whether the voltage value of the auxiliary power supply 202 (12 V) drops to 11 V or lower for 30 msec or longer.

In step S14, in a case where a short circuit occurs between the auxiliary power supply 202 and the first braking unit 60 (step S14: Yes), for example, as shown in FIG. 6, the power supply control unit 56 cuts off the connection between the auxiliary power supply 202 and the first braking unit 60 by turning off the switch s2 (step S16). In this case, the power supply control unit 56 controls the second braking unit 70 to start fixing the vehicle using ESB.

Next, the power supply control unit 56 determines whether the braking (vehicle fixation) by the second braking unit 70 is completed (step S17), and waits until the braking by the second braking unit 70 is completed (step S17: No). In a case where the braking by the second braking unit 70 is completed (step S17: Yes), the power supply control unit 56 establishes a connection between the main power supply 201 and the auxiliary power supply 202 by turning on the switch s1, and establishes a connection between the main power supply 201 and the first braking unit 60 by turning on the switch s3 (step S18), and ends the series of processing. Then, the state returns to FIG. 4.

In step S14, in a case where no short circuit occurs between the auxiliary power supply 202 and the first braking unit 60 (step S14: No), the power supply control unit 56 keeps the switch s2 on. In this way, the state in which the vehicle is fixed by the first braking unit 60 is maintained. In this case, the power supply control unit 56 determines whether the braking (vehicle fixation) by the first braking unit 60 is completed (step S19), and waits until the braking is completed (step S19: No). When the braking by the first braking unit 60 is completed (step S19: Yes), the power supply control unit 56 establishes a connection between the main power supply 201 and the auxiliary power supply 202 by turning on the switch s1, and establishes a connection between the main power supply 201 and the first braking unit 60 by turning on the switch s3, and cuts off the connection between the auxiliary power supply 202 and the first braking unit 60 by turning off the switch s2 (step S20), and ends the series of processing. Then, the state returns to FIG. 4.

In steps S18 and S20, the power supply control unit 56 may cut off the connection between the auxiliary power supply 202 and the first braking unit 60 by turning off the switch s2. In this case, the state becomes the state shown in FIG. 4, which is a default state before the voltage drop is detected by the first detection processing.

As described above, the power supply control unit 56 of the power supply device 200 makes the processing time T1 of the first detection processing 71 for detecting a failure related to the main power supply 201 shorter than the processing time T2 of the second detection processing 73 for detecting a failure related to the auxiliary power supply 202. According to this configuration, by shortening the processing time T1 for performing the detection processing for the main power supply 201 (for example, approximately 200 μsec), it is possible to prevent a voltage drop in the main power supply during a failure of the main power supply 201. By lengthening the processing time T2 of the detection processing for the auxiliary power supply 202 (for example, approximately 30 msec), it is possible to prevent false detection of a failure of the auxiliary power supply 202. Therefore, it is possible to prevent false detection of a failure related to the auxiliary power supply 202 while preventing the voltage drop of the main power supply 201.

When a failure related to the main power supply 201 is detected by the first failure determination 72, the power supply control unit 56 cuts off the power supply from the main power supply 201 to the auxiliary power supply 202, and after switching the power supply source of the first braking unit 60 from the main power supply 201 to the auxiliary power supply 202, starts the second detection processing 73 related to the auxiliary power supply 202. In this way, it is possible to prevent the voltage drop of the main power supply 201, and also to detect a failure (short circuit) occurring between the auxiliary power supply 202 and the first braking unit 60.

When a failure related to the auxiliary power supply 202 is detected by the second failure determination 74 while power is supplied from the auxiliary power supply 202 to the first braking unit 60, the power supply control unit 56 cuts off the power supply from the auxiliary power supply 202 to the first braking unit 60 and supplies power from the main power supply 201 to the first braking unit 60. In this way, even when a failure occurs in the auxiliary power supply 202, power may be continuously supplied to the first braking unit 60 (VSA, EPB).

The control method described in the embodiment described above may be implemented by executing a control program prepared in advance by a computer. The control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the power supply device, may be provided in an electronic device such as a smartphone, a tablet terminal, or a personal computer that can communicate with the power supply device, or may be provided in a server device that can communicate with the power supply device and the electronic device.

The embodiment of the present invention has been described above, but the present invention is not limited to the embodiment described above, and modifications, improvements, and the like may be made as appropriate.

For example, in the above embodiment, a case has been described in which the vehicle 10 automatically moves to a parking space (target parking position), but the present disclosure is not limited thereto. For example, the power supply device according to the present disclosure may be employed in a case where the vehicle 10 moves automatically on a road or the like.

In the present description, at least the following matters are described. Although corresponding constituent elements or the like in the above-described embodiments are shown in parentheses, the present invention is not limited thereto.

(1) A power supply device, including:
a main power supply (main power supply 201) that supplies power to an electric device:
an auxiliary power supply (auxiliary power supply 202) that supplies power to the electric device in response to a failure occurring in the main power supply: and
a power supply control unit (power supply control unit 56) that performs a first failure determination related to the main power supply and a second failure determination related to the auxiliary power supply, in which
the power supply control unit performs the first failure determination based on a result of first detection processing related to the main power supply,
the power supply control unit performs the second failure determination based on a result of second detection processing related to the auxiliary power supply, and
the power supply control unit sets a time for which the first detection processing is performed to be shorter than a time for which the second detection processing is performed.

According to (1), by shortening the time for performing the first detection processing for the main power supply, it is possible to prevent the voltage drop during a failure of the main power supply. By lengthening the time for performing the second detection processing for the auxiliary power supply, it is possible to prevent a false detection of a failure of the auxiliary power supply.

(2) The power supply device according to (1), in which the electric device is an electric device of a moving body (vehicle 10).

As in (2), the power supply device is preferably employed in a moving body.

(3) The power supply device according to (1) or (2), in which
the power supply control unit detects a failure related to the main power supply by the first failure determination, and starts the second detection processing after a power supply source of the electric device is switched from the main power supply to the auxiliary power supply.

According to (3), it is possible to prevent the voltage drop of the main power supply, and also to detect a failure (short circuit) occurring between the auxiliary power supply and the electric device.

(4) The power supply device according to any one of (1) to (3), in which
the power supply control unit causes the main power supply to supply power to the auxiliary power supply in a case where no failure related to the main power supply is detected by the first failure determination, and
the power supply control unit cuts off power supply from the main power supply to the auxiliary power supply in a case where a failure related to the main power supply is detected by the first failure determination.

According to (4), when a failure related to the main power supply is detected, by cutting off the power supplied from the main power supply to the auxiliary power supply, it is possible to prevent the voltage drop of the main power supply.

(5) The power supply device according to (4), in which
the electric device includes a braking unit (first braking unit 60) of a moving body,
in a case where no failure related to the auxiliary power supply is detected by the second failure determination after cutting off power supply from the main power supply to the auxiliary power supply in response to a failure related to the main power supply being detected by the first failure determination, the power supply control unit causes the auxiliary power supply to supply power to the braking unit, and,
in a case where a failure related to the auxiliary power supply is detected by the second failure determination after cutting off power supply from the main power supply to the auxiliary power supply in response to a failure related to the main power supply being detected by the first failure determination, the power supply control unit cuts off power supply from the auxiliary power supply to the braking unit.

According to (5), when a failure related to the auxiliary power supply is detected, the power consumption of the auxiliary power supply may be prevented by cutting off the power supplied from the auxiliary power supply to the braking unit.

(6) The power supply device according to (5), in which,
the power supply control unit causes the main power supply to supply power to the braking unit in a case where power supply from the auxiliary power supply to the braking unit is cut off in response to a failure related to the auxiliary power supply being detected by the second failure determination.

According to (6), even when a failure occurs in the auxiliary power supply, power may be continuously supplied to the braking unit.

(7) The power supply device according to according to any one of (1) to (6), in which the electric device includes a braking unit of a moving body, as the first failure determination, the power supply control unit detects a voltage drop of the main power supply, and, as the second failure determination, the power supply control unit detects a short circuit between the auxiliary power supply and the braking unit.

As in (7), it is preferable to detect a voltage drop as a failure of the main power supply, and it is preferable to detect a short circuit with the braking unit as a failure of the auxiliary power supply.

(8) The power supply device according to any one of (1) to (7), in which the electric device includes
 a braking unit of a moving body, and
 a movement control unit that performs movement control of the moving body, and the movement control unit controls the braking unit to stop the moving body in response to a failure related to the main power supply being detected by the first failure determination.

As in (8), it is preferable that the braking unit is controlled to stop the moving body when a failure related to the main power supply is detected.

(9) The power supply device according to (8), further including:

a notification unit (notification unit 57) that notifies a user of the moving body when the braking unit is controlled to stop the moving body.

As in (9), when the moving body is stopped by the operation of the braking unit, it is preferable to notify the user of this stop.

(10) A control method for a power supply device, the power supply device including a main power supply that supplies power to an electric device, an auxiliary power supply that supplies power to the power apparatus in response to a failure occurring in the main power supply, and a power supply control unit that performs a first failure determination related to the main power supply and a second failure determination related to the auxiliary power supply, the control method including:

performing, by the power supply control unit, the first failure determination based on a result of first detection processing related to the main power supply, performing, by the power supply control unit, the second failure determination based on a result of second detection processing related to the auxiliary power supply, and setting, by the power supply control unit, a time for which the first detection processing is performed to be shorter than a time for which the second detection processing is performed.

According to (10), by shortening the time for performing the first detection processing for the main power supply, it is possible to prevent the voltage drop during a failure of the main power supply. By lengthening the time for performing the second detection processing for the auxiliary power supply, it is possible to prevent a false detection of a failure of the auxiliary power supply.

(11) A non-transitory computer readable medium storing a control program for a power supply device, the power supply device including a main power supply that supplies power to a power apparatus, an auxiliary power supply that supplies power to the power apparatus in response to a failure occurring in the main power supply, and a power supply control unit that performs a first failure determination related to the main power supply and a second failure determination related to the auxiliary power supply, the control program causing the power supply control unit to execute a process including:

performing the first failure determination based on a result of first detection processing related to the main power supply, performing the second failure determination based on a result of second detection processing related to the auxiliary power supply is performed, and setting a time for which the first detection processing is performed to be shorter than a time for which the second detection processing is performed.

According to (11), by shortening the time for performing the first detection processing for the main power supply, it is possible to prevent the voltage drop during a failure of the main power supply. By lengthening the time for performing the second detection processing for the auxiliary power supply, it is possible to prevent a false detection of a failure of the auxiliary power supply.

What is claimed is:

1. A power supply device, comprising:
 a main power supply that supplies power to an electric device;
 an auxiliary power supply that supplies power to the electric device in response to a failure occurring in the main power supply; and
 a hardware processor configured to perform a first failure determination related to the main power supply and a second failure determination related to the auxiliary power supply, wherein
 the hardware processor performs the first failure determination based on a result of first detection processing related to the main power supply, the hardware processor determining that the failure in the main power supply occurs in response to a state in which a first condition related to the main power supply is satisfied continuing for a first time or more,
 the hardware processor performs the second failure determination based on a result of second detection processing related to the auxiliary power supply, the hardware processor determining that the failure in the auxiliary power supply occurs in response to a state in which a second condition related to the auxiliary power supply is satisfied continuing for a second time or more, and
 the hardware processor sets the first time for which the first failure determination is performed to be shorter than the second time for which the second determination is performed.

2. The power supply device according to claim 1, wherein the electric device is an electric device of a moving body.

3. The power supply device according to claim 1, wherein the hardware processor detects a failure related to the main power supply by the first failure determination, and starts the second detection processing after a power supply source of the electric device is switched from the main power supply to the auxiliary power supply.

4. The power supply device according to claim 1, wherein the hardware processor causes the main power supply to supply power to the auxiliary power supply in a case where no failure related to the main power supply is detected by the first failure determination, and the hardware processor cuts off power supply from the main power supply to the auxiliary power supply in a case where a failure related to the main power supply is detected by the first failure determination.

5. The power supply device according to claim 4, wherein the electric device includes a brake of a moving body,
in a case where no failure related to the auxiliary power supply is detected by the second failure determination after cutting off power supply from the main power supply to the auxiliary power supply in response to a failure related to the main power supply being detected by the first failure determination, the hardware processor causes the auxiliary power supply to supply power to the brake, and,
in a case where a failure related to the auxiliary power supply is detected by the second failure determination after cutting off power supply from the main power supply to the auxiliary power supply in response to a failure related to the main power supply being detected by the first failure determination, the hardware processor cuts off power supply from the auxiliary power supply to the brake.

6. The power supply device according to claim 5, wherein,
the hardware processor causes the main power supply to supply power to the brake in a case where power supply from the auxiliary power supply to the brake is cut off in response to a failure related to the auxiliary power supply being detected by the second failure determination.

7. The power supply device according to claim 1, wherein the electric device includes a brake of a moving body,
as the first failure determination, the hardware processor detects a voltage drop of the main power supply, and,
as the second failure determination, the hardware processor detects a short circuit between the auxiliary power supply and the brake.

8. The power supply device according to claim 1, wherein the electric device includes
a brake of a moving body, and
a hardware processor configured to perform movement control of the moving body, and
the hardware processor of the electric device controls the brake to stop the moving body in response to a failure related to the main power supply being detected by the first failure determination.

9. The power supply device according to claim 8, wherein the hardware processor of the power supply device is further configured to notify a user of the moving body when the brake is controlled to stop the moving body.

10. The power supply device according to claim 1, wherein
the first condition is satisfied when a voltage of the main power supply drops below a predetermined value, and
the second condition is satisfied when a voltage of the auxiliary power supply drops below a predetermined value.

11. A power supply device, comprising:
a main power supply that supplies power to an electric device;
an auxiliary power supply that supplies power to the electric device in response to a failure occurring in the main power supply; and
a hardware processor configured to perform a first failure determination related to the main power supply and a second failure determination related to the auxiliary power supply, wherein the hardware processor performs the first failure determination based on a result of first detection processing related to the main power supply,
the hardware processor performs the second failure determination based on a result of second detection processing related to the auxiliary power supply,
the hardware processor sets a time for which the first detection processing is performed to be shorter than a time for which the second detection processing is performed,
the hardware processor causes the main power supply to supply power to the auxiliary power supply in a case where no failure related to the main power supply is detected by the first failure determination,
the hardware processor cuts off power supply from the main power supply to the auxiliary power supply in a case where a failure related to the main power supply is detected by the first failure determination,
the electric device includes a brake of a moving body,
in a case where no failure related to the auxiliary power supply is detected by the second failure determination after cutting off power supply from the main power supply to the auxiliary power supply in response to a failure related to the main power supply being detected by the first failure determination, the hardware processor causes the auxiliary power supply to supply power to the brake, and,
in a case where a failure related to the auxiliary power supply is detected by the second failure determination after cutting off power supply from the main power supply to the auxiliary power supply in response to a failure related to the main power supply being detected by the first failure determination, the hardware processor cuts off power supply from the auxiliary power supply to the brake.

12. A power supply device, comprising:
a main power supply that supplies power to an electric device;
an auxiliary power supply that supplies power to the electric device in response to a failure occurring in the main power supply; and
a hardware processor configured to perform a first failure determination related to the main power supply and a second failure determination related to the auxiliary power supply, wherein
the hardware processor performs the first failure determination based on a result of first detection processing related to the main power supply,
the hardware processor performs the second failure determination based on a result of second detection processing related to the auxiliary power supply,
the hardware processor sets a time for which the first detection processing is performed to be shorter than a time for which the second detection processing is performed,
the electric device includes a brake of a moving body,
as the first failure determination, the hardware processor detects a voltage drop of the main power supply, and,
as the second failure determination, the hardware processor detects a short circuit between the auxiliary power supply and the brake.

13. A power supply device, comprising:
a brake that performs a braking operation of a moving body;
a main power supply that supplies power to the moving body;

an auxiliary power supply that is connected to the main power supply to be supplied power from the main power supply; and a hardware processor configured to perform a first failure determination related to the main power supply and a second failure determination related to the auxiliary power supply, wherein the brake includes a first brake and a second brake, the first brake is connected to be supplied power from the main power supply and the auxiliary power supply, the second brake is connected to be supplied power from the main power supply, the hardware processor performs the first failure determination based on a result of first detection processing related to the main power supply, the hardware processor performs the second failure determination based on a result of second detection processing related to the auxiliary power supply, the hardware processor sets a time for which the first detection processing is performed to be shorter than a time for which the second detection processing is performed, and power is supplied from the auxiliary power supply to the first brake when a failure related to the main power supply occurs.

14. The power supply device according to claim 13, wherein the hardware processor cuts off at least one of power supply from the main power supply to the auxiliary power supply or power supply from the main power supply to the first brake.

15. The power supply device according to claim 13, wherein the hardware processor detects the failure related to the main power supply in response to a voltage of the main power supply is less than a threshold in the first failure determination.

* * * * *